United States Patent
Wang et al.

(10) Patent No.: US 8,468,000 B1
(45) Date of Patent: *Jun. 18, 2013

(54) COMPUTER BASED MODELS FOR ABSORBENT ARTICLES

(71) Applicant: The Procter & Gamble Company, Cincinnati, OH (US)

(72) Inventors: Chengming Wang, Liberty Township, OH (US); Gene Xiaoqing Huang, Mason, OH (US); Arthur Joseph Koehler, Middletown, OH (US); Chuming Luke Hwang, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,440

(22) Filed: Feb. 8, 2013

Related U.S. Application Data

(63) Continuation of application No. 12/556,979, filed on Sep. 10, 2009, now Pat. No. 8,392,161.

(51) Int. Cl.
   *G06G 7/48* (2006.01)

(52) U.S. Cl.
   USPC ............................................................. 703/6

(58) Field of Classification Search
   USPC ....... 703/6, 9; 604/322, 367; 702/50; 700/31, 700/97
   See application file for complete search history.

(56) References Cited

U.S. PATENT DOCUMENTS

| | | | |
|---|---|---|---|
| 3,932,322 | A | 1/1976 | Duchane |
| 4,242,242 | A | 12/1980 | Allen |
| 4,251,643 | A | 2/1981 | Harada et al. |
| 5,164,459 | A | 11/1992 | Kimura et al. |
| 5,536,555 | A | 7/1996 | Zelazoski et al. |
| 5,744,564 | A | 4/1998 | Stanley et al. |
| 5,916,670 | A | 6/1999 | Tan et al. |
| 6,099,515 | A | 8/2000 | Sugito |
| 6,306,123 | B1 | 10/2001 | Salerno et al. |
| 6,738,735 | B1 | 5/2004 | Sherrod |
| 6,810,300 | B1 | 10/2004 | Woltman et al. |
| 6,907,310 | B2 | 6/2005 | Gardner |
| 7,039,486 | B2 | 5/2006 | Wang |
| 7,373,284 | B2 | 5/2008 | Stabelfeldt et al. |
| 7,684,939 | B2 | 3/2010 | Allende-Blanco |
| 2001/0031358 | A1 | 10/2001 | Tan et al. |
| 2004/0143229 | A1* | 7/2004 | Easter ..................... 604/322 |
| 2004/0236552 | A1 | 11/2004 | Pieper |
| 2005/0256686 | A1* | 11/2005 | Stabelfeldt et al. ............ 703/6 |
| 2005/0264563 | A1 | 12/2005 | Macura |
| 2005/0264572 | A1 | 12/2005 | Anast |

(Continued)

FOREIGN PATENT DOCUMENTS

| | | |
|---|---|---|
| WO | WO 2005/088488 | 9/2005 |

OTHER PUBLICATIONS

All Office Actions, U.S. Appl. No. 12/556,962.
All Office Actions, U.S. Appl. No. 12/556,979.

(Continued)

*Primary Examiner* — Kandasamy Thangavelu
(74) *Attorney, Agent, or Firm* — Christian M. Best; Charles R. Ware

(57) ABSTRACT

Methods of using computer based models for simulating the physical behavior of bodily fluids with absorbent articles.

23 Claims, 12 Drawing Sheets

U.S. PATENT DOCUMENTS

| | | | |
|---|---|---|---|
| 2005/0267613 | A1 | 12/2005 | Anast |
| 2005/0267615 | A1 | 12/2005 | Lavash et al. |
| 2006/0069369 | A1 | 3/2006 | Feldkamp et al. |
| 2006/0069375 | A1 | 3/2006 | Waksmundzki et al. |
| 2007/0034278 | A1 | 2/2007 | Li |
| 2007/0160966 | A1 | 7/2007 | Cohen et al. |
| 2007/0203679 | A1 | 8/2007 | Macura et al. |
| 2008/0046202 | A1* | 2/2008 | Allende-Blanco et al. ..... 702/50 |
| 2008/0139693 | A1 | 6/2008 | Ikeuchi et al. |
| 2008/0163054 | A1 | 7/2008 | Pieper et al. |
| 2008/0183450 | A1* | 7/2008 | Macura et al. .................... 703/9 |
| 2008/0215166 | A1* | 9/2008 | Blessing et al. ................ 700/31 |
| 2008/0269705 | A1* | 10/2008 | Kainth et al. ................. 604/367 |
| 2009/0076783 | A1 | 3/2009 | Babusik et al. |
| 2009/0164036 | A1* | 6/2009 | Seguro et al. .................. 700/97 |

OTHER PUBLICATIONS

PCT International Search Report and Written Opinion, PCT/US2010/048406 date of mailing Jan. 12, 2010.

PCT International Search Report and Written Opinion, PCT/US2010/048105 date of mailing Mar. 15, 2011.

"Diapers: Better by Design With CFD", Internet Citation, 2000, XP-002293841; URL: http://www.hikeytech.com/newsletters/n1208:pdf; retrieved on Aug. 25, 2004.

Gibson, et al., "Computational Modeling of Clothing Performance", The British Library—The World's Knowledge, Chapter 15, pp. 542-559, 2006.

Wang, et al., "A Finite-Difference Computing Model for 3-D Simulation of the Powder Injection Molding Process", The British Library—The World's Knowledge, pp. 435-449, Jun. 2003.

Wang, et al., "Determining Optimal Semi-Solid Forming Process Parameters by Simulation Technique", The British Library—The World's Knowledge, pp. 327-334, Jun. 1998.

Nickodemus et al., "Rheology of Materials for Semi-Solid Metalworking Applications", The British Library—The World's Knowledge, pp. 29-34, Jun. 1998.

Weickert et al., "A Mathematical Model for Diffusion and Exchange Phenomena in Ultra Napkins", Mathematical Methods in the Applied Sciences, vol. 16, 759-777 (1993).

"Designing a Leakproof Diaper, High Performance Computing Infrastructure and Accomplishments", Hearing Before the U.S. House of Representatives, Mar. 19, 1996, 3 pp. 154-155.

Sobera et al., "Hydraulic Permeability of Ordered and Disordered Single-Layer Arrays of Cylinders", Physical Review E 74, pp. 036301-1 through 036301-10 (2006).

Sobera et al., "Convective Heat and Mass Transfer to a Cylinder Sheathed by a Porous Layer", AIChe Journal, Dec. 2003, vol. 49, No. 12, pp. 3018-3028.

Sobera et al, "A Multi-scale Numerical Study of the Flow, Heat, and Mass Transfer in Protective Clothing", Springer-Verlag Berlin Heidelberg 2004, pp. 637-644.

Barry et al., "Computational Fluid Dynamics Modeling of Fabric Systems for Intelligent Garment Design", MRS Bulletin/Aug. 2003, pp. 568-573.

Sobera et al., "Subcritical flow past a circular cylinder surrounded by a porous layer", Physics of Fluids 18, 038106 (2006) pp. 038106-1 through 03106-4.

* cited by examiner

COMPUTER BASED MODELS FOR ABSORBENT ARTICLES

CROSS REFERENCE TO RELATED APPLICATION

This application is a continuation of and claims priority under 35 U.S.C. §120 to U.S. patent application Ser. No. 12/556,979, filed on Sep. 10, 2009, the entire disclosure of which is hereby incorporated by reference.

FIELD

In general, embodiments of the present disclosure relate to computer based models for absorbent articles. In particular, embodiments of the present disclosure relate to methods of using computer based FEA and CFD models for simulating the physical behavior of bodily fluids with absorbent articles.

BACKGROUND

Absorbent articles include diapers and incontinence garments as well as feminine pads and liners. Absorbent articles can receive, contain, and absorb bodily exudates. It can be difficult to predict the physical behavior of bodily fluids as they are received into and absorbed by an absorbent article. As a result, it can be difficult to predict whether or not an absorbent article of a particular design can adequately contain bodily exudates.

SUMMARY

However, embodiments of the present disclosure can at least assist in predicting whether or not a particular absorbent article design can adequately contain bodily exudates. The present disclosure includes methods of simulating the physical behavior of bodily fluids with absorbent articles. As a result, particular absorbent article designs and/or absorbent materials can be evaluated and modified as computer based models before they are tested as real world things.

DETAILED DESCRIPTION

Figure 1:
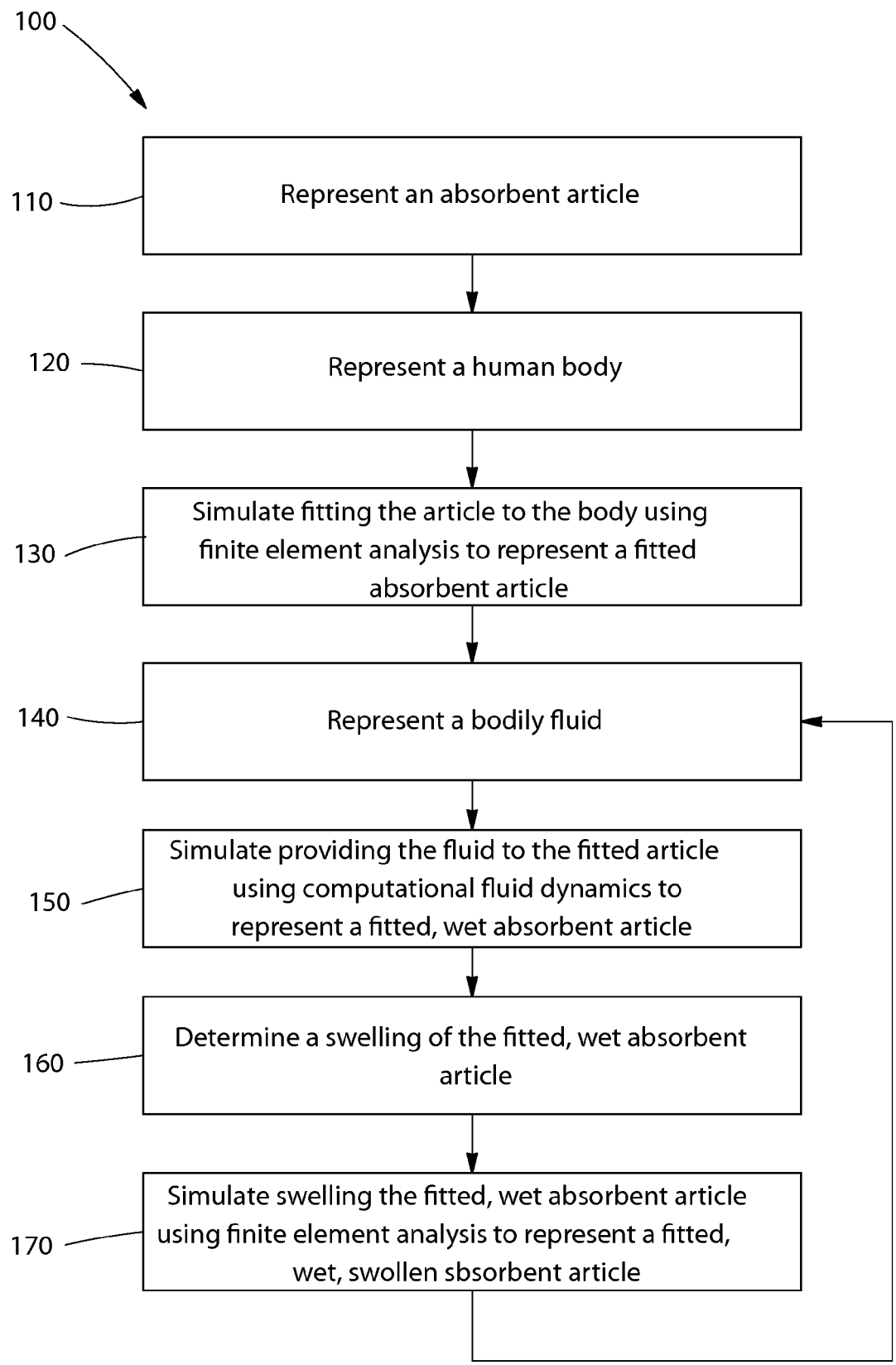
FIG. 1 is a chart illustrating a method of using computer based models for simulating the physical behavior of a bodily fluid with an absorbent article.

The present disclosure includes methods of simulating the physical behavior of bodily exudates with absorbent articles. Embodiments of the present disclosure can at least assist in predicting whether or not a particular absorbent article design can adequately contain bodily exudates. As a result, particular absorbent article designs and absorbent materials can be evaluated and modified as computer based models before they are tested as real world things.

Computer aided engineering (CAE) is a broad area of applied science in which technologists use software to develop computer based models that represent real world things. The models can be transformed to provide various information about the physical behavior of those real world things, under certain conditions and/or over particular periods of time. With CAE, the interactions of the computer based models are referred to as simulations. Sometimes the real world things are referred to as a problem and the computer based model is referred to as a solution. There are several major categories of CAE.

Finite element analysis (FEA) is a major category of CAE. In FEA, models representing mechanical articles, as well as their features, components, structures, and/or materials are transformed to predict stress, strain, displacement, deformation, and other mechanical behaviors. FEA represents a continuous solid material as a set of discrete elements. In FEA, the mechanical behavior of each element is calculated, using equations that describe mechanical behavior. The results of all of the elements are summed up, to represent the mechanical behavior of the material as a whole.

Computation fluid dynamics (CFD) is another major CAE category. In CFD, models representing fluids (e.g. liquids and/or gases) are transformed to predict pressure, flow, temperature, and other fluid and/or thermal properties. CFD also represents a continuous fluid material as a set of discrete elements. A CFD element is often referred to as a cell, a finite difference cell, or a finite volume. However, for ease of reference, the term element is used throughout the present disclosure for CFD models. Unless otherwise stated, a reference to an element, in context of CFD, can refer to a cell, a finite difference cell, or a finite volume, as will be understood by one of ordinary skill in the art. In CFD, the fluid behavior is calculated for the elements, using equations that describe fluid behavior. For example, CFD often employs the Navier- Stokes equations, or variations thereof. The equations are solved iteratively, to represent the fluid behavior of the material as a whole.

Commercially available software can be used to conduct CAE. Abaqus, from SIMULIA in Providence, R.I., and LSDyna from Livermore Software Technology Corp. in Livermore, Calif., are examples of commercially available FEA software. Fluent, from ANSYS, Inc. in Canonsburg, Pa., Flow3D, from Flow Science, Inc. in Santa Fe, N. Mex., and FeFlow from DHI-WASY in Berlin, Germany are examples of commercially available CFD software. Alternatively, CAE software can be written as custom software. CAE software can be run on various computer hardware, such as a personal computer, a minicomputer, a cluster of computers, a mainframe, a supercomputer, or any other kind of machine on which program instructions can execute to perform CAE functions.

CAE software can represent a number of real world things, such as absorbent articles. An absorbent article can receive, contain, and absorb bodily exudates (e.g. urine, menses, feces, etc.). Absorbent articles include products for sanitary protection, for hygienic use, and the like.

Some absorbent articles are wearable. A wearable absorbent article is configured to be worn on or around a lower torso of a body of a wearer. Examples of wearable absorbent articles include diapers and incontinence undergarments.

Some absorbent articles are disposable. A disposable absorbent article is configured to be disposed of after a single use (e.g., not intended to be reused, restored, or laundered). Examples of disposable absorbent articles include disposable diapers, disposable incontinence undergarments, as well as feminine care pads and liners.

Some absorbent articles are reusable. A reusable absorbent article is configured to be partly or wholly used more than once. A reusable absorbent article is configured such that part or all of the absorbent article is durable, or wear-resistant to laundering, or fully launderable. An example of a reusable absorbent article is a diaper with a washable outer cover.

CAE can be used to design, simulate, and/or evaluate all kinds of absorbent articles, their features, materials, structures, and compositions, as well as their performance characteristics, such as swelling and deformation.

FIG. 1 is a chart illustrating a method 100 of steps 110-170 for using computer based models for simulating the physical behavior of bodily fluids with the absorbent article. Although the steps 110-170 are described in numerical order in the present disclosure, in various embodiments some or all of these steps can be performed in other orders, and/or at overlapping times, and/or at the same time, as will be understood by one of ordinary skill in the art.

The method 100 includes a first step 110 of representing an absorbent article with a computer based model. In various embodiments, the model can represent a fastenable absorbent article, or a pant-type absorbent article, or a feminine pad, or another kind of absorbent article. The model of the absorbent article can be created as described in connection with the embodiments of FIGS. 2A-2C. In the first step 100, the model may represent the absorbent article in a dry state, wherein the absorbent article has not been wetted or soiled. Alternatively, in the first step 100, the model may represent the absorbent article in a wet state, wherein the absorbent article has been partially wetted or soiled.

The method 100 includes a second step 120 of representing a human body with a computer based model. The model can represent an entire human body or can represent one or more portions of a human body. If the model represents only a portion of a human body, then the model should represent one or more portions of a human body to which the absorbent article of the first step 110 is intended to be fitted. In various embodiments, the model can represent a male human body, or a female human body, or an androgynous human body (lacking gender specific anatomical features). The model of the human body can be created as described in connection with the embodiments of FIGS. 3A-3B.

The method 100 includes a third step 130 of transforming the absorbent article by simulating a fitting of the absorbent article to the human body using FEA. The transforming of the third step 130 includes a mechanical interaction between the model of the absorbent article from the first step 110 and the model of the human body of the second step 120. Prior to or during the third step 130, these models can be brought together. For a wearable absorbent article, the fitting is a donning of the absorbent article. For a feminine pad or liner, the fitting is a placement of the absorbent article in an in-use position. The fitting simulated in the third step 130 can be performed as described in connection with the embodiments of FIGS. 4A-4C.

In the fitting simulated in the third step 130, FEA program instructions can execute to simulate the mechanical interaction between the model of the absorbent article from the first step 110 and the model of the human body of the second step 120. However, the present disclosure contemplates that, in an alternate embodiment, part, or parts, or all of the third step 130 can be performed using another kind of computer based program instructions, as will be understood by one of skill in the art. The simulation of the third step 130 transforms the model of the absorbent article from the first step 110 and the model of the human body of the second step 120 to form a computer based model that represents a fitted absorbent article. For a wearable absorbent article, the simulation of the third step 130 results in a model that represents the fitted absorbent article being worn around a lower torso of the human body. For a feminine pad or liner, the simulation of the third step 130 results in a model that represents the fitted absorbent article positioned proximate to a pudendal region of the human body. The simulation of the third step 130 may also result in some deformation in the model of the fitted absorbent article and/or in the model of the human body.

In an alternate embodiment of the method 100, the second step 120 can be omitted and the third step 130 can be modified, to simulate a fitting of the absorbent article to a human body, without using a model of a human body. In this embodiment, boundary conditions can position and/or constrain the model of the absorbent article from the first step 110 to represent the absorbent article as if it is being fitted to a human body.

Boundary conditions are defined variables that represent physical factors acting within a computer based model. Examples of boundary conditions include forces, pressures, velocities, and other physical factors. Each boundary condition can be assigned a particular magnitude, direction, and location within the model. These values can be determined by observing, measuring, analyzing, and/or estimating real world physical factors. In various embodiments, computer based models can also include one or more boundary conditions that differ from real world physical factors, in order to account for inherent limitations in the models and/or to more accurately represent the overall physical behaviors of real world things, as will be understood by one of ordinary skill in the art. Boundary conditions can act on the model in various ways, to move, constrain, and/or deform one or more parts in the model.

While the alternate approach of representing the absorbent article as if it is being fitted to a human body may not form a completely realistic representation of the fitted absorbent article, it may still be used to provide some of the benefits of the method.

The method 100 includes a fourth step 140 of representing a bodily fluid with a computer based model. In various embodiments, the model can represent a bodily fluid such as urine, or menses, or another kind of bodily fluid, or runny feces, or a liquid-like bodily exudate. In an alternative embodiment, a model can represent a solid bodily exudate such as feces.

The method 100 includes a fifth step 150 of transforming the fitted absorbent article by simulating a provision of a bodily fluid to the fitted absorbent article. Prior to or during the fifth step 150, these models can be brought together. The simulation of the fifth step 150 can include one or more of the following: a flow of the model of the bodily fluid of the fourth step 140 from the model of the human body of the third step 130, a flow of the model of the bodily fluid of the fourth step 140 through a model of air, a flow of the model of the bodily fluid of the fourth step 140 on a surface of the model of the human body of the third step 130, a flow of the model of the bodily fluid of the fourth step 140 on an external surface of the model of the fitted absorbent article of the third step 130, and a flow of the model of the bodily fluid of the fourth step 140 through absorbent material of the model of the fitted absorbent article of the third step 130.

In the provision simulated in the fifth step 150, CFD program instructions can execute to simulate each of these fluid flows, as described in connection with the embodiment of FIG. 5. However, the present disclosure contemplates that, in an alternate embodiment, part, or parts, or all of the fifth step 150 can be performed using another kind of computer based program instructions. The simulation of the fifth step 150 transforms the model of the bodily fluid of the of the fourth step 140 and the model of the fitted absorbent article from the third step 130 to form a computer based model that represents a fitted, wet absorbent article. The model of the fitted, wet absorbent article includes a distribution of the bodily fluid on and/or in the absorbent article.

In the embodiment of the method 100, the simulation of the fifth step 150 does not include simulating a swelling of the fitted absorbent article; the swelling is simulated in a subsequent step. In an alternate embodiment, the fifth step 150 can include simulating a partial or complete swelling of the fitted absorbent article.

In an alternate embodiment of the method 100, the fifth step 150 may simulate a provision of a bodily fluid directly to the fitted absorbent article, without simulating a flow of the bodily fluid. In this alternate embodiment, boundary conditions can position and/or constrain the model of the bodily fluid to represent a distribution of the bodily fluid in and/or on the model of the fitted absorbent article.

In this alternate embodiment, the computer based model of the bodily fluid can be positioned and/or constrained in locations and concentrations that are similar to or the same as locations and amounts that represent a real world bodily fluid in a real world absorbent article. These locations and amounts can be determined by measuring actual samples, by using known values, or by estimating values. For example, real world locations and amounts of a bodily fluid can be determined by measuring (e.g. by X-ray. magnetic resonance imaging, or by another process) one or more actual samples of soiled absorbent articles. While this alternate approach may not form a completely realistic distribution of the bodily fluid, it may still be used to provide some of the benefits of the method.

The method 100 includes a sixth step 160 of determining a calculated swelling of the fitted, wet absorbent article by using a computer based model. The swelling determination in the sixth step 160 can be performed as described in connection with the embodiment of FIG. 7.

The method 100 includes a seventh step 170 of transforming the fitted, wet absorbent article by simulating the swelling of the fitted absorbent article from the bodily fluid. using FEA. In the swelling simulated in the seventh step 170, FEA program instructions can execute to simulate the mechanical change in the model of the fitted, wet absorbent article from the fifth step 150. However, the present disclosure contemplates that, in an alternate embodiment, part, or parts, or all of the seventh step 170 can be performed using another kind of computer based program instructions, as will be understood by one of skill in the art. The simulation of the seventh step 170 transforms the model of the fitted, wet absorbent article from the fifth step 150 to form a computer based model that represents a fitted, wet, swollen absorbent article. The swelling simulation in the seventh step 170 can be performed as described in connection with the embodiments of FIGS. 8A-8B.

After the seventh step 170 is completed, the method can be ended or the method can be extended by repeating one or more of the previous steps. In the method 100, after the seventh step 170 is completed, the fourth through seventh steps 140-170 can be repeated, as indicated by the return arrow in FIG. 1. By following this repeat, the method 100 can be used to simulate multiple insults of a bodily fluid to the absorbent article. In the real world, an absorbent article is often worn by a wearer for a wear cycle that includes more than one insult of a bodily fluid. As a result, by simulating multiple insults of bodily fluid, the method 100 can be used to accurately represent the real-world use of an absorbent article.

In various embodiments of the method 100, the model of the human body of the second step 120 can be constrained to assume one or more particular positions or to assume one or more changes in position, as described herein, during the second step 120 and/or before, during, or after any of the subsequent steps. For example, during the fitting of the third step 130, the model of the human body can be constrained to assume a lying position. As another example, during the fitting of the third step 130, the model of the human body can be constrained to assume change in positions (e.g. a natural body movement In some embodiments of the method 100, one or more environmental objects and/or environmental conditions can physically interact with part, or parts, or all of the model of the absorbent article of the first step 110, as described herein, during the first step 110 and/or before, during, or after any of the subsequent steps. For example, during the fitting of the third step 130, a model of a changing surface can physically interact with the model of the absorbent article.

In some embodiments of the method 100, one or more environmental objects and/or environmental conditions can physically interact with part, or parts, or all of the model of the human body of the second step 120, as described herein, during the second step 120 and/or before, during, or after any of the subsequent steps. For example, during the fitting of the third step 130, a model of a changing surface can physically interact with the model of the human body.

In some embodiments of the method 100, one or more environmental objects and/or environmental conditions can physically interact with part, or parts, or all of the model of the bodily fluid of the fourth step 140, as described herein, during the fourth step 140 and/or before, during, or after any of the subsequent steps. For example, during and after the fourth step 140, a model of the force of gravity can physically interact with the model of the bodily fluid.

Figure 2A:
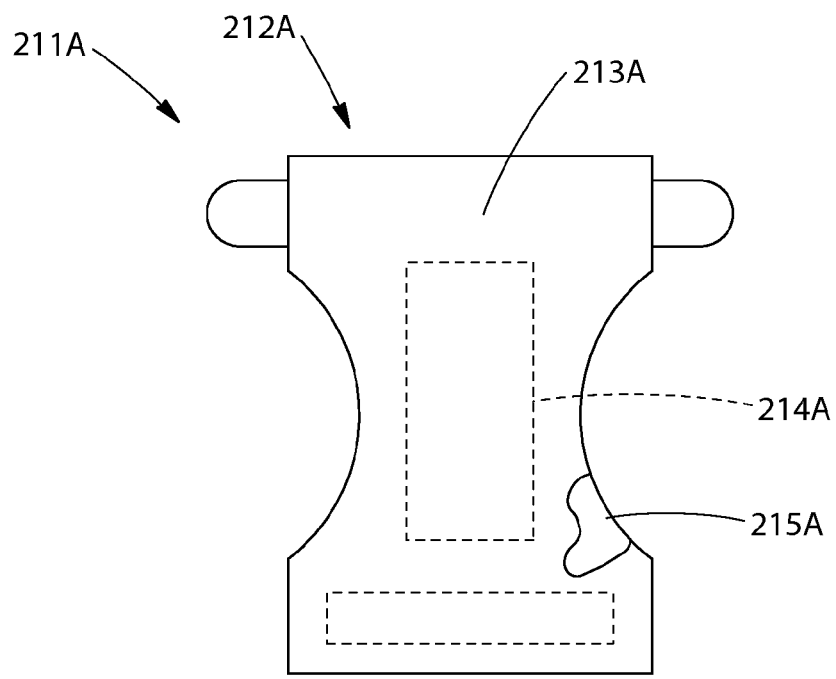
FIG. 2A is an inside plan view illustrating a computer based model representing a front-fastenable wearable absorbent article.
Figure 2B:
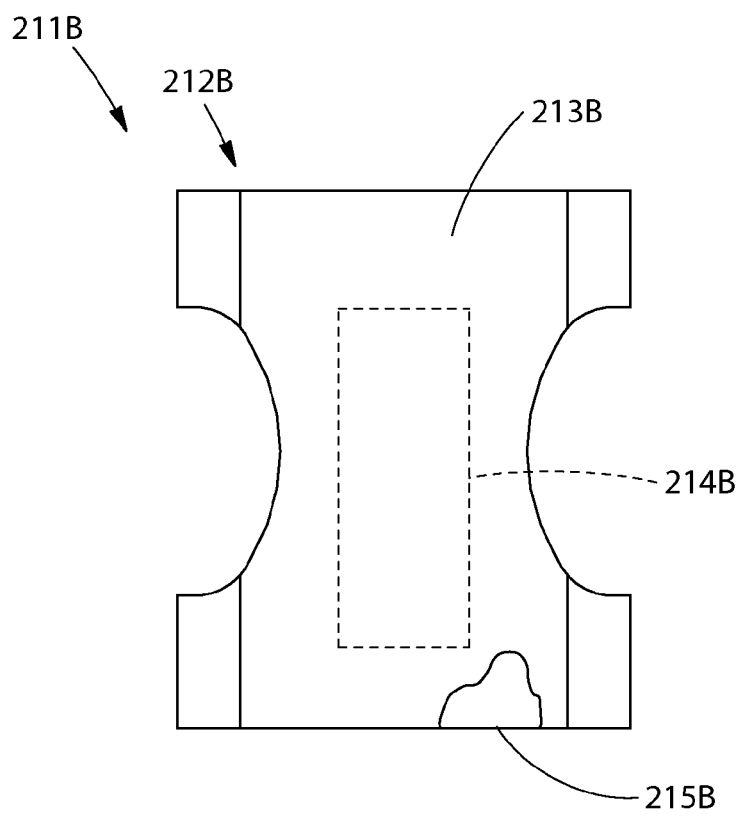
FIG. 2B is an inside plan view illustrating a computer based model representing a pant-type wearable absorbent article.
Figure 2C:
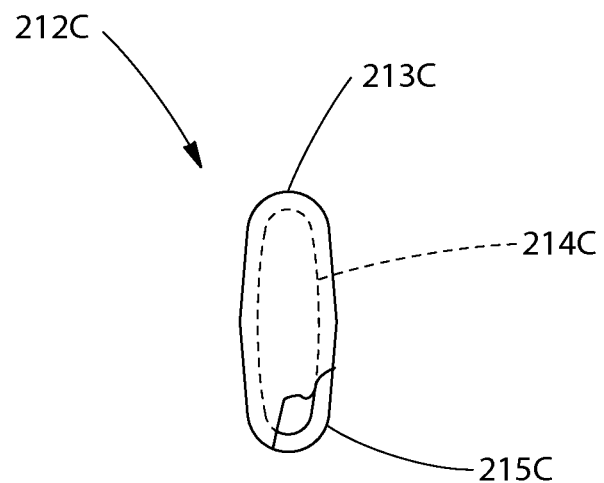
FIG. 2C is an inside plan view illustrating a computer based model representing a feminine pad absorbent article.

FIGS. 2A-2C illustrate computer based models of various absorbent articles. For clarity, FIGS. 2A-2C do not illustrate all details of the absorbent articles.

FIG. 2A is an inside plan view illustrating a computer based model 211A of a front-fastenable wearable absorbent article 212A. The present disclosure contemplates that, a model of an absorbent article that is configured to be front-fastenable can also be configured to be rear fastenable or side-fastenable, as will be understood by one of ordinary skill in the art.

The front-fastenable wearable absorbent article 212A includes a wearer-facing external surface 213A, a garment-facing external surface 215A, and an absorbent material 214A. The absorbent material 214A is disposed between the wearer-facing external surface 213A and the garment-facing external surface 215A.

The wearer-facing external surface 213A is a layer of one or more materials that form at least a portion of an inside of the front-fastenable wearable absorbent article and faces a wearer when the absorbent article 212A is worn by the wearer. In FIG. 2A, a portion of the wearer-facing external surface 213A is illustrated as broken-away, in order to show the garment-facing external surface 215A. A wearer-facing external surface is sometimes referred to as a topsheet. The wearer-facing external surface 213A is configured to be liquid permeable, such that bodily fluids received by the absorbent article 212A can pass through the wearer-facing external surface 213A to the absorbent material 214A. In various embodiments, a wearer-facing external surface can include a nonwoven material and/or other materials.

The absorbent material 214A is disposed subjacent to the wearer-facing external surface 213A and superjacent to the garment-facing external surface 215A, in at least a portion of the absorbent article 212A. In some embodiments, an absorbent material of an absorbent article is part of a structure referred to as an absorbent core. The absorbent material 214A is configured to be liquid absorbent, such that the absorbent material 214A can absorb bodily fluids received by the absorbent article 212A. In various embodiments, an absorbent material can include wood pulp, or super absorbent polymers (SAP), or another kind of absorbent material, or any combinations of any of these materials.

The garment-facing external surface 215A is a layer of one or more materials that form at least a portion of an outside of the front-fastenable wearable absorbent article and faces a wearer's garments when the absorbent article 212A is worn by the wearer. A garment-facing external surface is sometimes referred to as a backsheet. The garment-facing external surface 215A is configured to be liquid impermeable, such that bodily fluids received by the absorbent article 212A cannot pass through the garment-facing external surface 213A. In various embodiments, a garment-facing external surface can include a film and/or other materials.

FIG. 2B is an inside plan view illustrating a computer based model 211B of a pant-type wearable absorbent article 212B. The present disclosure contemplates that, a model of an absorbent article that is configured to be pant-type can be configured to be side-fastenable or without fasteners, as will be understood by one of ordinary skill in the art.

The pant-type wearable absorbent article 212B includes a wearer-facing external surface 213B, a garment-facing external surface 215B, and an absorbent material 214B, which are each generally configured in the same manner as the like-numbered element in the embodiment of FIG. 2A.

FIG. 2C is an inside plan view illustrating a computer based model 211C of a feminine pad absorbent article 212C. The feminine pad absorbent article 212C includes a wearer-facing external surface 213C, a garment-facing external surface 215C, and an absorbent material 214C, which are each configured in a manner similar to the like-numbered element in the embodiments of FIGS. 2A and 2B.

Each of the computer based models 211A, 211B, and 211C can be created as described below, with general references to a computer based model of an absorbent article. A computer based model that represents an absorbent article can be created by providing dimensions and material properties to modeling software and by generating a mesh for the article using meshing software.

A computer based model of an absorbent article can be created with dimensions that are similar to or the same as dimensions that represent parts of a real world absorbent article. These dimensions can be determined by measuring actual samples, by using known values, or by estimating values. Alternatively, a model of an absorbent article can be configured with dimensions that do not represent a real world absorbent article. For example, a model of an absorbent article can represent a new variation of a real world absorbent article or can represent an entirely new absorbent article. In these examples, dimensions for the model can be determined by varying actual or known values, by estimating values, or by generating new values. The model can be created by putting values for the dimensions of parts of the absorbent article into the modeling software.

The computer based model of the absorbent article can be created with material properties that are similar to or the same as material properties that represent a real world absorbent article. These material properties can be determined by measuring actual samples, by using known values, or by estimating values. Alternatively, a model of an absorbent article can be configured with material properties that do not represent a real world absorbent article. For example, a model of an absorbent article can represent a new variation of a real world absorbent article or can represent an entirely new absorbent article. In these examples, material properties for the model can be determined by varying actual or known values, by estimating values, or by generating new values.

The computer based model of the absorbent article can be created with a mesh for the parts of the article. A mesh is a collection of small, connected polygon shapes that define the set of discrete elements in a CAE computer based model. The type of mesh and/or the size of elements can be controlled with user inputs into the meshing software, as will be understood by one of ordinary skill in the art. In an exemplary embodiment, an external surface of an absorbent article can be created by using shell elements, such as linear triangular elements (also known as S3R elements) with an element size of about 1.5 millimeters, to represent a nonwoven material. Also, in an exemplary embodiment, an SAP absorbent material can be created by using solid elements, such as linear hexahedral elements (also known as C3D8R elements) with an element size of about 1.5 millimeters.

Figure 3A:
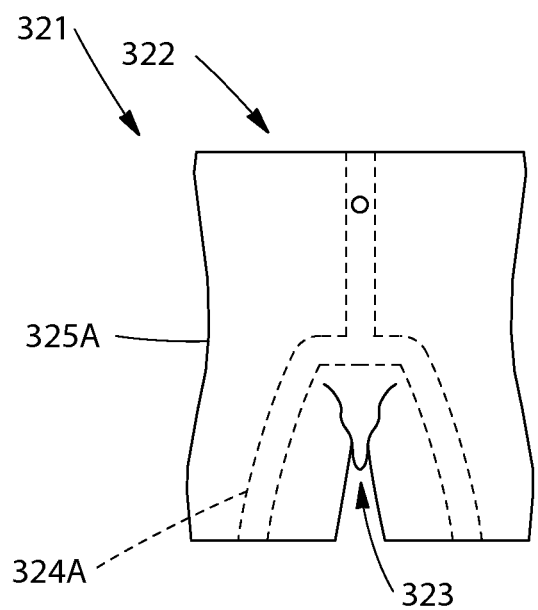
FIG. 3A is a front view illustrating a computer based model representing a portion of a male human body.

FIG. 3A is a front view illustrating a computer based model 321 that represents a portion of a male human body 322. The male human body 322 includes a male pee point 323, a support structure 324A, and a flesh structure 325A. The male pee point 323 is located in an anatomically correct location, which is the urethral opening at the end of the penis. The support structure 324A provides an approximation of a skeletal system of a human body. In various embodiments, the support structure 324A can be configured to allow the male human body 322 to move in a manner that is similar to or the same as real-world movements of the human body.

The flesh structure 325A provides an approximation of the skin, tissue, muscle, and organs of a male human body. In the embodiment of FIG. 3A, the flesh structure 325A is intended to represent the portion of the male human body 322 that is not represented by the support structure 324A. However, in alternate embodiments, the skin, tissue, muscle, and/or organs of a human body can be represented by a number of separate structures.

In embodiments wherein the support structure 324A allows the male human body 322 to move, the flesh structure 324A can be configured to follow the support structure in such movements. In various embodiments, the flesh structure 325A can be configured to deform in a manner that is similar to or the same as real-world deformation of the human body.

In various embodiments, wherein the male human body 322 can move, the computer based model of the male human body 321 can be constrained to assume one or more particular positions, or to assume one or more changes in position. The particular positions can include lying down, sitting, on hands and knees, kneeling, standing, or any other position that can represent a real world body position, or variations of any of these. The changing of positions can include twisting, turning, leaning, rocking, rolling, crawling, cruising, walking, jumping, running, or any other change of positions that can represent a real world body movement, or variations of any of these. The changing of positions can be accomplished by moving the model through the positions in series, by moving the model in a discontinuous fashion, or by moving the model in a continuous fashion. In various embodiments, the model of the male human body 321 can be configured to assume changes in position that are similar to or the same as a human body's natural range of motion.

Figure 3B:
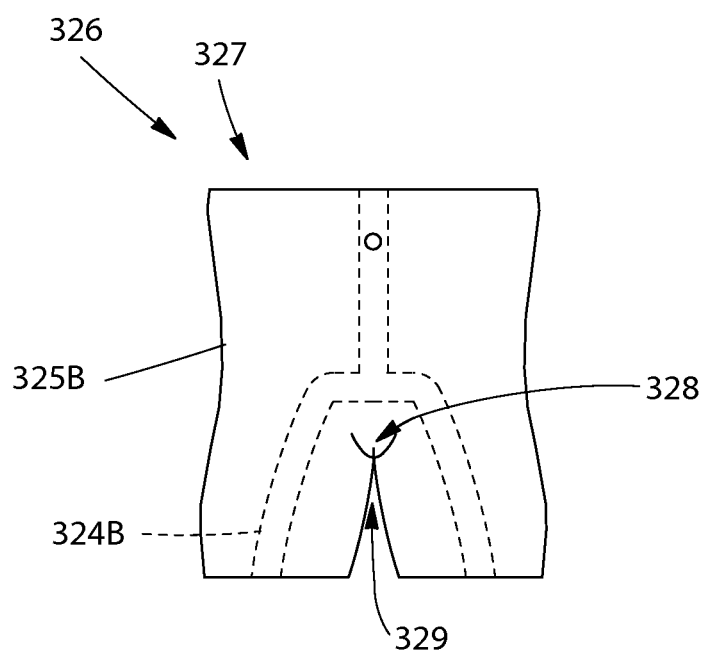
FIG. 3B is a front view illustrating a computer based model representing a portion of a female human body.

FIG. 3B is a front view illustrating a computer based model 326 that represents a portion of a female human body 327. The female human body 327 includes a support structure 324B, a flesh structure 325B, a female pee point 328, and a vaginal opening 329. The female pee point 328 is located in an anatomically correct location, which is the urethral opening in the center of the pudendal region. The vaginal opening 328 is also located in an anatomically correct location, which is at the rear of the pudendal region. The support structure 324B is generally configured in a manner similar to the like-numbered element in the embodiment of FIG. 3A. The flesh structure 325A provides an approximation of the skin, tissue, muscle, and organs of a female human body, and is otherwise generally configured in a manner similar to the like-numbered element in the embodiment of FIG. 3A. The female human body 327 can be constrained to assume one or more particular positions or to assume a change in position, in the same way as the male human body 322.

Each of the computer based models 321 and 326 can represent a human body of any age, including, for example: as an infant, a toddler, a child, an adolescent, a young adult, a middle-aged adult, an older adult, or an elderly person. Each of the computer based models 321 and 326 can represent a human of any body type, including, variations in size and shape.

Each of the computer based models 321 and 326 can be created as described below, with general references to a computer based model of a human body. A computer based model that represents a human body can be created by providing dimensions and material properties to modeling software and by generating a mesh for the article using meshing software.

A computer based model of a human body can be created with dimensions that are similar to or the same as dimensions of one or more real world human bodies. These dimensions can be determined by measuring bodies, by using known values, or by estimating values. The model can be created by putting values for dimensions of the human body into the modeling software.

The computer based model of the human body can be created with material properties that are similar to or the same as material properties that represent a real world human body. These material properties can be determined by measuring actual samples, by using known values, or by estimating values.

The computer based model of the human body can be created with a mesh for the parts of the body. In an exemplary embodiment, a support structure of a human body can be created by using shell elements, such as S3R, defined as rigid element sets, with an element size of about 6.5 millimeters. Also, in an exemplary embodiment, a flesh structure of a human body can be created by using deformable, solid elements, such as C3D4 with an element size of about 4 millimeters.

Figure 4A:
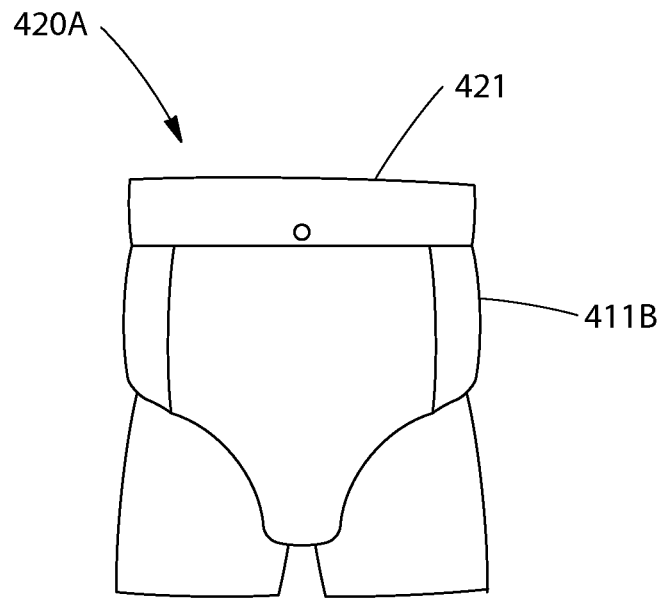
FIG. 4A is a front view illustrating a computer based model representing a pant-type wearable absorbent article fitted to a portion of a male human body.

FIG. 4A is a front view illustrating a computer based model 420A representing a pant-type wearable absorbent article 411B fitted to a portion of a male human body 421. The model of the pant-type wearable absorbent article 411B can be configured in the same way as the model 211B of FIG. 2B. The model of the male human body 421 can be configured in the same way as the model 321 of FIG. 3A. In an alternate embodiment, a computer based model can represent a pant-type wearable absorbent article fitted to a portion of a female human body, wherein the model of the female human body can be configured in the same way as the model 326 of FIG. 3B. In various embodiments, the model 420A may also include one or more garments worn by the human body.

Figure 4B:
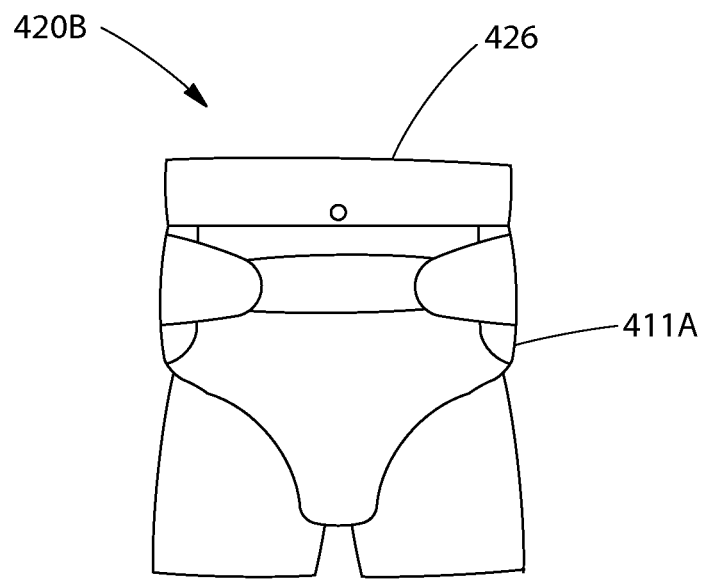
FIG. 4B is a front view illustrating a computer based model representing a front-fastenable wearable absorbent article fitted to a portion of a female human body.

FIG. 4B is a front view illustrating a computer based model 420B representing a front-fastenable wearable absorbent article 411A fitted to a portion of a female human body 426. The model of the front-fastenable wearable absorbent article 411A can be configured in the same way as the model 211A of FIG. 2A. The model of the female human body 426 can be configured in the same way as the model 326 of FIG. 3B. In an alternate embodiment, a computer based model can represent a front-fastenable wearable absorbent article fitted to a portion of a male human body, wherein the model of the male human body can be configured in the same way as the model 321 of FIG. 3A. In various embodiments, the model 420B may also include one or more garments worn by the human body.

Each of the computer based models 420A and 420B can be created as described below, with general references to computer based models of wearable absorbent articles and human bodies. In a computer based model, a model of a human body can don a model of a wearable absorbent article in various ways. As a first example, a model of a wearable absorbent article can be positioned and/or constrained to represent the absorbent article as if it is being fitted to a human body, and the model of the human body can then be positioned inside of the wearable absorbent article.

As a second example, a model of a wearable absorbent article can be fitted to a model of a human body in a manner that is similar to or the same as real-world movements of a human body donning a wearable absorbent article. As an example, for a front-fastenable wearable absorbent article, the fitting may include rotating the legs of the human body and fastening the article around the lower torso of the body. As another example, for a pant-type wearable absorbent article, the fitting may include spreading the legs of the human body and pulling the article up unto the lower torso of the body.

Figure 4C:
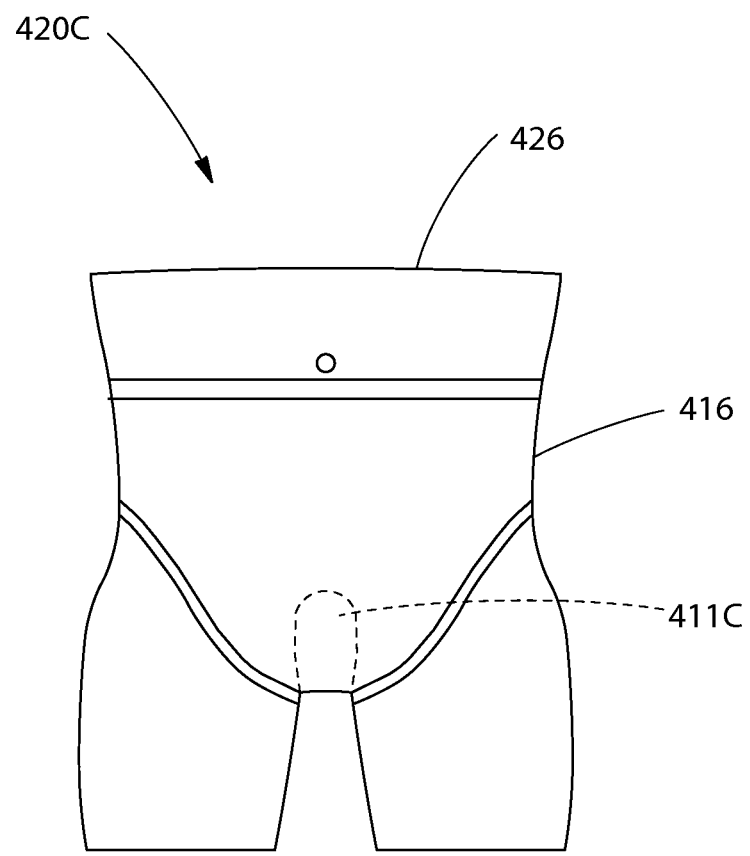
FIG. 4C is a front view illustrating a computer based model representing a feminine pad absorbent article fitted to a portion of a female human body.

FIG. 4C is a front view illustrating a computer based model 420C representing a feminine pad absorbent article 411C fitted to a portion of a female human body 426 inside of a garment 416 worn by the female human body 426. The model of the feminine pad absorbent article 411A can be configured in the same way as the model 211C of FIG. 2C. The model of the female human body 426 can be configured in the same way as the model 326 of FIG. 3B. In the embodiment of FIG. 4C, the garment 416 is holding the feminine pad absorbent article 411A in an in-use position.

The garment 416 can be any kind of garment, such as an undergarment. A computer based model that represents a garment can be created by providing appropriate dimensions and material properties to modeling software and by generating a mesh for the garment using meshing software. In various embodiments, the model 420C may also include one or more additional garments worn by the human body.

The computer based model 420C can be created as described below, with general references to computer based models of feminine absorbent articles and human bodies. In a computer based model, a model of a feminine wearable absorbent article can be placed in an in-use position for a model of a human body in various ways. A model of a feminine absorbent article can be fitted to a model of a human body in a manner that is similar to or the same as real-world movements of a human body placing the article in an in-use position. As an example, a model of a garment can be positioned and/or constrained to represent the garment as if it is being fitted to a human body, a model of a feminine wearable absorbent article can be positioned and/or constrained to represent the article as if it is being held by the garment, and the model of the human body can then be positioned inside of the garment.

In an alternate embodiment of the model 420C, the garment 416 can be omitted and the model 420C can be modified, to simulate a fitting of the absorbent article to a human body without using a garment. In this embodiment, boundary conditions can position and/or constrain the model of the feminine pad absorbent article 411A to represent the feminine pad absorbent article 411A as if it is being fitted to a human body. While this alternate approach may not form a completely realistic representation of the fitted absorbent article, it may still be used to provide some of the benefits of the model.

Each of the computer based models 420A, 420B, and 420C can be created as described below, with general references to computer based models of absorbent articles, garments, and human bodies. In a computer based model, the fitting of an absorbent article to a human body may represent an ideal fit as intended by the manufacturer of the absorbent article, or the fitting may represent a less than ideal fit as sometimes occurs in the real-world use of absorbent articles. Additionally, a computer based model can represent the removal of an absorbent article from a human body, in various ways. These approaches can be accomplished with the use of boundary conditions in the models, as will be understood by one of skill in the art.

A computer based model that represents a human body and an absorbent article can also include a representation of part, or parts, or all of one or more environmental objects and/or one or more environmental conditions. An environmental object can be any object that would physically interact with an absorbent article or a human body in the real-world. For example, an environmental object can be a changing surface, on which a human body is placed when fitting an absorbent article to the body. An environmental condition can be any condition that would physically interact with an absorbent article or a human body in the real-world. As examples, an environmental condition can be gravity, hot or cold temperatures, etc.

A computer based model that represents a human body and an absorbent article can include defined interactions between its parts. Defined interactions are prescribed terms that govern physical relationships within a computer based model. Examples of defined interactions include terms that govern the presence, absence, or magnitude of contact, friction, relative movement, and other physical relationships. Each defined interaction can be assigned a particular value and extent within the model. These interactions can be determined by observing, measuring, analyzing, and/or estimating real world physical interactions. In various embodiments, computer based models can also include one or more defined interactions that differ from real world physical interactions, in order to account for inherent limitations in the models and/or to more accurately represent the overall physical behaviors of real world things, as will be understood by one of ordinary skill in the art. Defined interactions can act on the model in various ways, to allow, prohibit, amplify, or limit one or more physical relationships in the model.

Each of the models 420A, 420B, and 420C includes defined interactions that allow part, or parts, or all of the human body to physically interact with part, or parts, or all of the absorbent article. When a model includes a garment, the model can include defined interactions that allow part, or parts, or all of the garment to physically interact with part, or parts, or all of the absorbent article, and/or to physically interact with part, or parts, or all of the human body. When a model includes environmental objects or conditions, the model can include defined interactions that allow part, or parts, or all of the environmental objects or conditions to physically interact with part, or parts, or all of the absorbent article, and/or to physically interact with part, or parts, or all of the human body.

Figure 5:
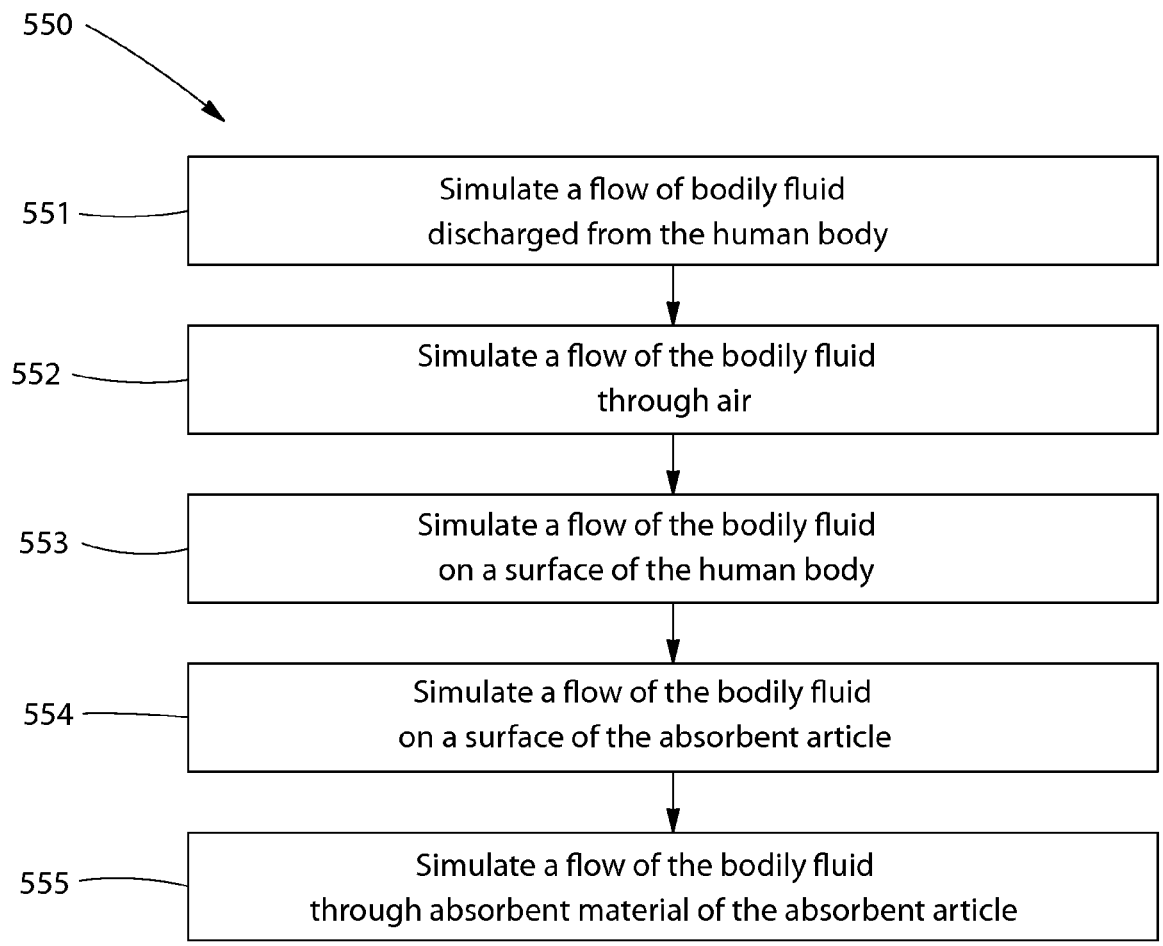
FIG. 5 is a chart illustrating a method of using computer based models for simulating the discharge and flow of a bodily fluid in an absorbent article.

FIG. 5 is a chart illustrating a method 500 of using computer based models for simulating the discharge and flow of a bodily fluid in an absorbent article. Part, or parts, or all of the method 500 can be used in the fifth step 150 of the method 100 of the embodiment of FIG. 1. Accordingly, in the description of the method 500, a reference to an absorbent article refers to a computer based model of an absorbent article, as described in connection with the first step 110 and the third step 130 of the method 100 of the embodiment of FIG. 1, and a reference to a human body refers to a computer based model of a human body, as described in connection with the second step 120 and the third step 130 of the method 100 of the embodiment of FIG. 1. The steps of the method 500 are also explained in relation to the embodiments of FIGS. 6A-6C, as described below. Although the steps 551-555 are described in numerical order in the present disclosure, in various embodiments some or all of these steps can be performed in other orders, and/or at overlapping times, and/or at the same time, as will be understood by one of ordinary skill in the art.

Figure 6A:
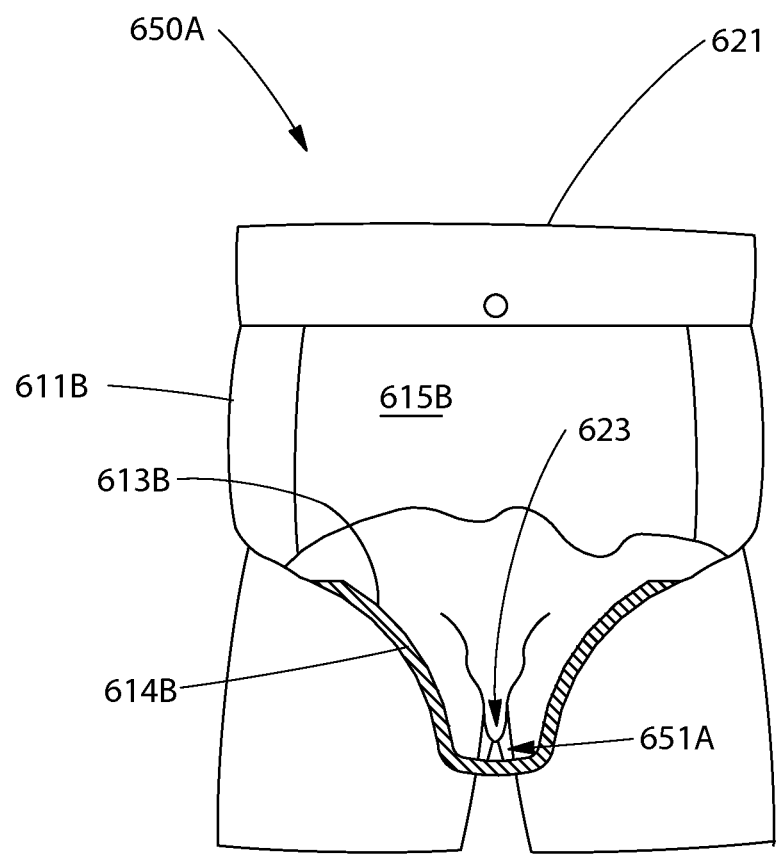
FIG. 6A is a front view illustrating a computer based model simulating a urine discharge from a male human body to a wearable absorbent article.
Figure 6B:
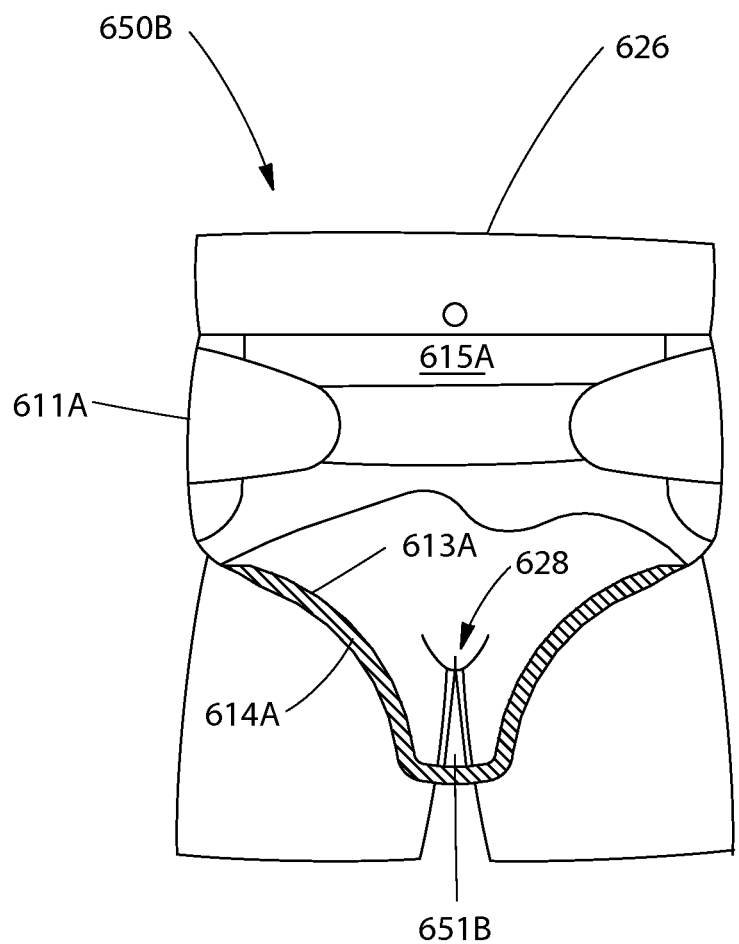
FIG. 6B is a front view illustrating a computer based model simulating a urine discharge from a female human body to a wearable absorbent article.
Figure 6C:
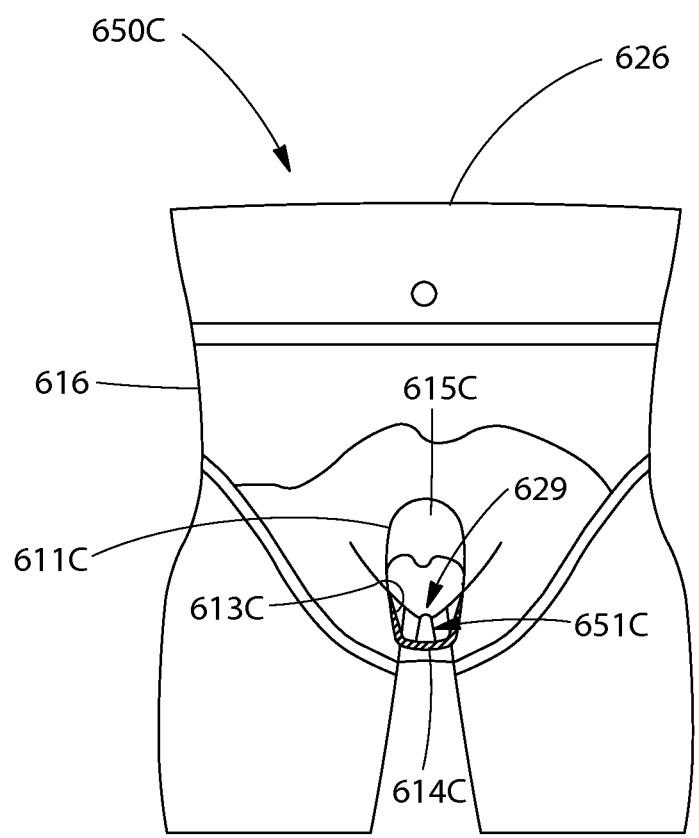
FIG. 6C is a front view illustrating another computer based model simulating a menses discharge from a female human body to a feminine absorbent article.

The method 500 includes a first step 551 of simulating a flow of bodily fluid as it is discharged from the human body. The discharge in the first step 551 can simulate a discharge of urine from a male human body, as illustrated in the embodiment of FIG. 6A, a discharge of urine from a female human body, as illustrated in the embodiment of FIG. 6B, a discharge of menses from a female human body, as illustrated in the embodiment of FIG. 6C, or a discharge of any kind of bodily fluid from a male human body, a female human body, or an androgynous human body.

A computer based model that represents a bodily fluid can be created by providing volume and material properties to modeling software and by generating a mesh for the fluid using meshing software. A computer based model of a bodily fluid can be created with a volume that is similar to or the same as a volume of one or more discharges from real world human bodies. These volumes can be determined by measuring discharges of bodily fluids, by using known values, or by estimating values. The model can be created by putting values for a volume of the bodily fluid into the modeling software. The computer based model of the human body can be created with fluid properties that are similar to or the same as fluid properties that represent a real world bodily fluid. These material properties can be determined by measuring actual samples, by using known values, or by estimating values.

In general, urine can be modeled as a non-viscous or Newtonian viscous fluid, similar to water. In an exemplary embodiment, a model of a bodily fluid can be created by using structured mesh cells, such as finite volumes with a cell size of about 1 millimeter, to represent urine. Menses can have varying consistencies, which can be modeled in various ways, as a viscous or non-viscous fluid, having Newtonian or non-Newtonian properties. In an exemplary embodiment, a model of a bodily fluid can be created by using structured mesh cells, such as finite volumes with a cell size of about 1 millimeter, to represent menses.

If the model of the human body is androgynous, then the location and orientation of the discharge of the model of the bodily fluid can be approximated with reference to the human body. For example, the discharge may be provided from a front or central portion of an outside of a crotch of the model of the androgynous human body. Similarly, in an alternate embodiment of the method 500, wherein a model of a human body is not used, the location and orientation of the discharge of the model of the bodily fluid may be approximated with reference to the model of the absorbent article. For example, the discharge may be provided to a front or central portion of an inside of a crotch of the model of the absorbent article.

In an alternate embodiment of the method 500, the first step 551 can be omitted, and the model of the bodily fluid can be provided to the model of the absorbent article without simulating a discharge from a human body.

The method 500 includes a second step 552 of simulating a flow of the model of bodily fluid through a model of air. A computer based model that represents air can be created by providing dimensions and air properties to modeling software and by generating a mesh for the air using meshing software. In an alternate embodiment of the method 500, the second step 552 can be omitted, and the model of the bodily fluid can be provided to the model of the absorbent article without simulating a movement through air.

The method 500 includes a third step 553 of simulating a flow of the model of bodily fluid on a surface of the model of the human body. In an alternate embodiment of the method 500, the third step 553 can be omitted, and the model of the bodily fluid can be provided to the model of the absorbent article without simulating a flow of the model of bodily fluid on a surface of the model of the human body.

The method 500 also includes a fourth step 554 of simulating a flow of the model of bodily fluid on a surface of the model of the absorbent article. In an alternate embodiment of the method 500, the fourth step 554 can be omitted, and the model of the bodily fluid can be provided to the model of the absorbent article without simulating a flow of the model of bodily fluid on a surface of the model of the absorbent article.

The method 500 also includes a fifth step 555 of simulating a flow of the model of bodily fluid through absorbent material of the model of the absorbent article. In an alternate embodiment of the method 500, the fifth step 554 can be omitted, and the model of the bodily fluid can be provided to the model of the absorbent article without simulating a flow of the model of bodily fluid through absorbent material of the model of the absorbent article.

FIG. 6A is a front view illustrating a computer based model 650A simulating a urine discharge 651A from a portion of a male human body 621 to a pant-type wearable absorbent article 611B that is fitted to the male human body 621. The model 650A is configured in the same way as the model 420A of FIG. 4A.

The pant-type wearable absorbent article 611B includes a wearer-facing external surface 613B, an absorbent material 614B, and a garment-facing external surface 615B, which are each configured in the same manner as the like-numbered element in the embodiment of FIG. 2B. The male human body 621 includes a male pee point 623, which is configured in the same manner as the like-numbered element in the embodiment of FIG. 3A.

In FIG. 6A, the urine discharge 651A originates from the male pee point 623 and flows through air to the wearer-facing external surface 613B of the pant-type absorbent article 611B. The urine then flows on and/or through the wearer-facing external surface 613B, as well as into and/or through the absorbent material 614B. As part of the simulating, urine may also flow on an external surface of the male human body 621. CFD program instructions can execute to simulate each of these fluid flows.

FIG. 6B is a front view illustrating a computer based model 650B simulating a urine discharge 651B from a female human body 626 to a front-fastenable wearable absorbent article 611A that is fitted to the female human body 626. The model 650B is configured in the same way as the model 420B of FIG. 4B.

The front-fastenable wearable absorbent article 611A includes a wearer-facing external surface 613A, an absorbent material 614A, and a garment-facing external surface 615A, which are each configured in the same manner as the like-numbered element in the embodiment of FIG. 2A. The female human body 626 includes a female pee point 628, which is configured in the same manner as the like-numbered element in the embodiment of FIG. 3B.

In FIG. 6B, the urine discharge 651B originates from the female pee point 628 and flows on an external surface of the female human body 626 and/or through air to the wearer-facing external surface 613A of the front-fastenable absorbent article 611A. The urine then flows on and/or through the wearer-facing external surface 613A, as well as into and/or through the absorbent material 614A. CFD program instructions can execute to simulate each of these fluid flows.

FIG. 6C is a front view illustrating a computer based model 650C simulating a menses discharge 651C from a female human body 626 to a feminine pad wearable absorbent article 611C that is inside of a garment 616 and fitted to the female human body 626. The model 650C is configured in the same way as the model 420C of FIG. 4C.

The feminine pad wearable absorbent article 611C includes a wearer-facing external surface 613C, an absorbent material 614C, and a garment-facing external surface 615C, which are each configured in the same manner as the like-numbered element in the embodiment of FIG. 2C. The female human body 626 includes a vaginal opening 629, which is configured in the same manner as the like-numbered element in the embodiment of FIG. 3B. The garment 616 is configured in the same manner as the like-numbered element in the embodiment of FIG. 4C.

In FIG. 6C, the menses discharge 651C originates from the female vaginal opening 629 and flows on an external surface of the female human body 626 and/or through air to the wearer-facing external surface 613C of the feminine pad absorbent article 611C. The menses then flows on and/or through the wearer-facing external surface 613C, as well as into and/or through the absorbent material 614C. CFD program instructions can execute to simulate each of these fluid flows.

Figure 7:
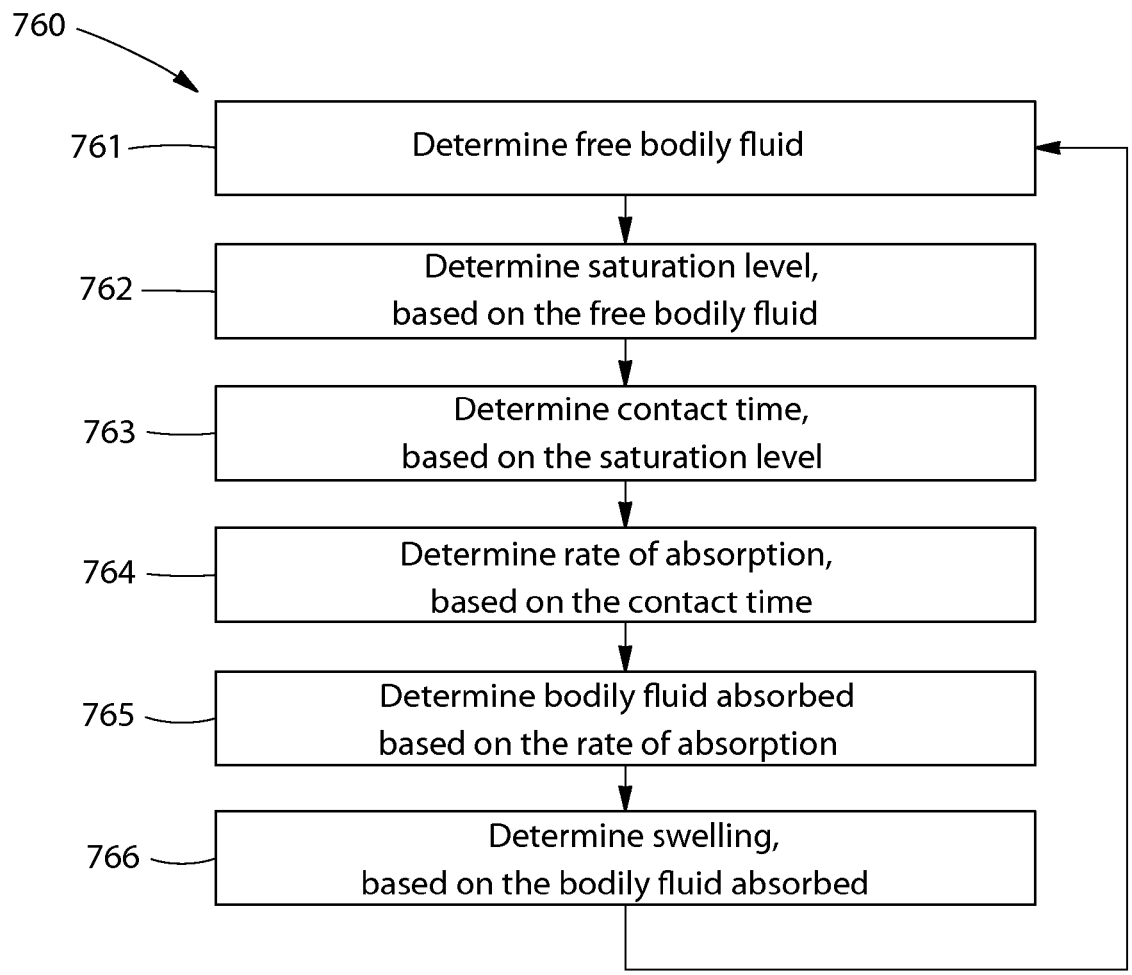
FIG. 7 is a chart illustrating a method of using computer based models for determining swelling from a bodily fluid in an absorbent article.

FIG. 7 is a chart illustrating a method 760 of using computer based models for determining a swelling of an absorbent material in an absorbent article from a provision of a bodily fluid. Part, or parts, or all of the method 760 can be used in the sixth step 160 of the method 100. Accordingly, in the description of the method 760, a reference to an absorbent article refers to a computer based model of an absorbent article, and a reference to a human body refers to a computer based model of a human body, as described in connection with the method 100 of the embodiment of FIG. 1. Further, in the description of the method 760, a reference to an element refers to an exemplary element in a set of discrete elements, wherein each element represents a volume including absorbent material of the absorbent article.

The method 760 is intended to be performed in an iterative fashion. Each iteration of the method 760 is performed in a particular time step, which governs the time-dependent physical behavior of the bodily fluid and the absorbent material. The method 760 is also intended to be performed for each element in the set of discrete elements. Although the steps 761-766 are described in numerical order in the present disclosure, in various embodiments some or all of these steps can be performed in other orders, and/or at overlapping times, and/or at the same time, as will be understood by one of ordinary skill in the art.

The method 760 includes a first step 761 of determining an amount of free bodily fluid currently in the element. As used herein, the term free bodily fluid refers to a bodily fluid that is not absorbed within an absorbent material, but is free to move in, on, or through the absorbent article or be absorbed by the absorbent material. The amount of free bodily fluid currently in the element can be determined based on the amount of free bodily fluid previously in the element, the amount of the bodily fluid previously absorbed by absorbent material in the element, the amount of the bodily fluid flowing into the element, and the amount of the bodily fluid flowing out of the element. This relationship can be expressed as follows:

$$M_{free\,fluid\,curr} = M_{free\,fluid\,prev} - M_{fluid\,abs\,prev} + M_{fluid\,in} - M_{fluid\,out}$$

Each of these variables can be expressed as a value in grams, or another appropriate unit of mass. In an alternate embodiment, these variables can be expressed in units of volume.

$M_{free\,fluid\,prev}$ represents the mass of the free bodily fluid in the element, at the beginning of the first step 761. In an initial iteration of the method 760, a value for $M_{free\,fluid\,prev}$ can be determined from a simulated provision of bodily fluid to the element. The provision of a free bodily fluid can be simulated as described in connection with the fifth step 150 of the method 100 of the embodiment of FIG. 1. Alternatively, the provision can be simulated by another computer based model of a free bodily fluid, as described herein or as known to one of skill in the art. When the method 760 is performed in an iterative fashion, $M_{free\,fluid\,curr}$ from a first iteration of the method can be used as $M_{free\,fluid\,prev}$ in a second iteration of the method.

$M_{fluid\,abs\,prev}$ represents the mass of the bodily fluid previously absorbed by the absorbent material in the element. In an initial iteration of the method 760, a value for $M_{fluid\,abs}$ can be set to zero. When the method 760 is performed in an iterative fashion, $M_{fluid\,abs\,curr}$ from the fifth step 765 of a first iteration of the method can be used as $M_{fluid\,abs\,prev}$ in the first step 761 of a second iteration of the method. Alternatively, $M_{fluid\,abs\,prev}$ can be determined by another computer based model of absorption, as described herein or as known to one of skill in the art.

$M_{fluid\,in}$ represents the mass of the bodily fluid flowing into the element, during the first step 761. $M_{fluid\,out}$ represents the mass of the bodily fluid flowing out of the element, during the first step 761. The bodily fluid can flow into and out of the element. $M_{fluid\,in}$ and $M_{fluid\,out}$ can be determined by using fluid dynamics. Program instructions, such as CFD program instructions, can execute to use fluid dynamics to determine the flow of the bodily fluid into and out of the element.

$M_{free\,fluid\,curr}$ represents the calculated mass of the free bodily fluid in the element, at the end of the first step 761. Program instructions can execute to calculate $M_{free\,fluid\,curr}$ from the equation shown above. In an alternate embodiment of the method 760, the first step 761 can be omitted and $M_{free\,fluid\,curr}$ can be determined by another computer based model of free bodily fluid in an element of absorbent material, as described herein or as known to one of skill in the art. For example, models for simulating the physical behavior of bodily fluids with absorbent articles can be found in US patent application publication 2009/0099793, "Method for Evaluation of Absorption Behavior of Absorbent Articles" by Rosati, et al.

The method 760 includes a second step 762 of determining a current saturation level of the bodily fluid in the element. The current saturation level in the element can be determined based on the amount of free bodily fluid in the element, the density of the bodily fluid, the porosity of the absorbent material in the element, and the volume of the element. This relationship can be expressed as follows:

$$S_{elementcurr} = \frac{M_{freefluidcurr}}{(\rho_{fluid})(\varepsilon_{abs})(\Omega_{elementcurr})}$$

$M_{free\,fluid\,curr}$ represents the mass of the free bodily fluid in the element during the second step 762. $M_{free\,fluid\,curr}$ can be determined as described in connection with the first step 761.

$\rho_{fluid}$ represents the density of the bodily fluid and is expressed in grams/cubic centimeter, or other appropriate units of density. $\rho_{fluid}$ can be determined by measuring actual samples, by using known values, or by estimating values for the density of the bodily fluid. In some embodiments, the density of water can be used as an approximate value for the density of urine. In other embodiments, a density of 1.04 grams/cubic centimeter can be used as an estimated value for the density of menses. In the embodiment of FIG. 7, $\rho_{fluid}$ is a constant value.

$\varepsilon_{abs}$ represents a porosity of the absorbent material, during the second step 762. Porosity is the degree to which the absorbent material occupies the element. $\varepsilon_{abs}$ is a unitless value. An $\varepsilon_{abs}$ value of 1.0 represents a complete absence of absorbent material from the element. An $\varepsilon_{abs}$ value of 0.0 represents a presence of absorbent material throughout the entire element. $\varepsilon_{abs}$ can be determined from the model of the absorbent article, as described in connection with the first step 110 of the method 100 of the embodiment of FIG. 1. Program instructions can execute to calculate $\epsilon_{abs}$ based on the amount of the absorbent material in the element and the geometry of the element. Alternatively, $\epsilon_{abs}$ can be determined by measuring actual samples, by using known values, or by estimating values for the porosity of the absorbent material.

$\Omega_{element\ curr}$ represents the volume of the element, during the second step 762. $\Omega_{element\ curr}$ is expressed in cubic centimeters, or other appropriate units of volume. In an initial iteration of the method 760, $\Omega_{element\ curr}$ can be determined from the model of the absorbent article, as described in connection with the first step 110 of the method 100 of the embodiment of FIG. 1. Program instructions can execute to calculate $\Omega_{element\ curr}$ based on the geometry of the element. When the method 760 is performed in an iterative fashion, $\Omega_{element\ next}$ from the sixth step 766 of a first iteration of the method can be used as $\Omega_{element\ curr}$ in the second step 762 of a second iteration of the method.

$S_{element\ curr}$ represents the current saturation of the element by the free bodily fluid, at the end of the second step 762. $S_{element\ curr}$ is a unitless value. Program instructions can execute to calculate $S_{element\ curr}$ from the equation shown above.

In one alternate embodiment of the method 760, the second step 762 can be omitted and $S_{element\ curr}$ can be determined by another computer based model of saturation, as described herein or as known to one of skill in the art. In other alternate embodiments of the method 760, the second step 762 can be omitted and $S_{element\ curr}$ can be determined by measuring actual samples, by using known values, or by estimating values for the saturation of the element.

The method 760 includes a third step 763 of determining a contact time between the bodily fluid in the element and the absorbent material in the element. The contact time in the element can be determined based on the saturation of the absorbent material in the element. This relationship can be expressed as follows:

$$t_{contactcurr} = \int_0^{t_{current}} S_{element}\, dt$$

$S_{element}$ represents the saturation of the element by the free bodily fluid over time, from the beginning of the first iteration of the method 760 (t=0) to the third step 763 of the current iteration of the method 760. $S_{element}$ can be determined by plotting $S_{element\ curr}$ versus real world time for each iteration of the method 760. $S_{element\ curr}$ can be determined for each iteration as described in connection with the second step 762.

$t_{current}$ represents the total real world time elapsed from the beginning of the first iteration of the method 760 to the third step 763 of the current iteration of the method 760. $t_{current}$ is expressed as a value in seconds, or another appropriate unit of time. Program instructions can execute to calculate $t_{current}$ by summing up the time values for each of the previous iterations.

$t_{contact\ curr}$ represents the current contact time between the bodily fluid in the element and the absorbent material in the element. $t_{contact\ curr}$ is expressed as a value in seconds, or another appropriate unit of time. Program instructions can execute to calculate $t_{contact\ curr}$ from the relationship shown above, by integrating $S_{element}$ over time, from the beginning of the first iteration of the method 760 (t=0) to $t_{current}$, as will be understood by one of skill in the art. In other words, $t_{contact\ curr}$ can be calculated by summing up the $S_{element\ curr}$ values for each of the iterations.

In one alternate embodiment of the method 760, the third step 763 can be omitted and $t_{contact\ curr}$ can be determined by another computer based model of contact time, as described herein or as known to one of skill in the art. In other alternate embodiments of the method 760, the third step 763 can be omitted and $t_{contact\ curr}$ can be determined by measuring actual samples, by using known values, or by estimating values for the contact time within the element.

The method 760 includes a fourth step 764 of determining a current rate of absorption for the absorbent material in the element. The current rate of absorption can be determined based on the mass of the bodily fluid absorbed by the absorbent material in the element current, which can be determined as a function of the current contact time between the bodily fluid in the element and the absorbent material in the element. This relationship can be expressed as follows:

$$\dot{M}_{fluidabscurr} = \frac{dM_{fluidabs}}{dt} = f(t_{contactcurr})$$

$M_{fluidabs}$ represents the mass of the bodily fluid absorbed over contact time, from the beginning of the first iteration of the method 760 ($t_{contact}=0$) to the fourth step 764 of the current iteration of the method 760. $M_{fluidabs}$ can be determined by plotting $M_{fluidabscurr}$ versus $t_{contact\ curr}$ for each iteration of the method 760. $M_{fluidabscurr}$ can be determined for each iteration as described in connection with the fifth step 765. $t_{contact\ curr}$ can be determined for each iteration as described in connection with the third step 763.

$\dot{M}_{fluidabscurr}$ represents the current mass flow rate for the absorption of the bodily fluid by the absorbent material in the element. $\dot{M}_{fluidabscurr}$ can be expressed as a value in grams per second, or another appropriate unit of mass over time. In alternate embodiments, the absorption flow rate can be expressed in other units. Program instructions can execute to calculate $\dot{M}_{fluidabscurr}$ from the relationship shown above by taking the differential of $M_{fluidabs}$ with respect to time, and determining $\dot{M}_{fluidabscurr}$ at the current contact time, as will be understood by one of skill in the art. In other words, $\dot{M}_{fluidabscurr}$ can be calculated by determining the rate of change for the plot of $M_{fluidabs}$ at $t_{contact\ curr}$.

The method 760 includes a fifth step 765 of determining a current amount of the bodily fluid that is absorbed by the absorbent material in the element during the fifth step 765 of the current iteration. The current amount of the bodily fluid that is absorbed can be determined based on the current rate of absorption for the absorbent material in the element and the time step for the current iteration. This relationship can be expressed as follows:

$$M_{fluidabscurr} = (\dot{M}_{fluidabscurr} \cdot t_{step})$$

$\dot{M}_{fluidabscurr}$ represents the current mass flow rate for the absorption of the bodily fluid by the absorbent material in the element. $\dot{M}_{fluidabscurr}$ can be determined as described in connection with the fourth step 764. $t_{step}$ represents the time step for the current iteration of the method 760. $M_{fluid\ abs\ curr}$ represents the mass of the bodily fluid absorbed by the absorbent material in the element, during the current iteration. Program instructions can execute to calculate $M_{fluid\ abs\ curr}$ from the equation shown above.

In various embodiments, the amount of the bodily fluid that is absorbed may be limited by the amount of free bodily fluid in the element. That is $M_{free\ fluid\ curr}$ may limit the $M_{fluid\ abs\ curr}$. Program instructions can execute to calculate $M_{fluid\ abs\ curr}$ by taking into account limitations from $M_{free\ fluid\ curr}$.

In one alternate embodiment of the method 760, the fifth step 765 can be omitted and $M_{fluid\ abs\ curr}$ can be determined by another computer based model of the bodily fluid absorbed by the absorbent material, as described herein or as known to one of skill in the art. In other alternate embodiments of the method 760, the fifth step 765 can be omitted and $M_{fluid\ abs\ curr}$ can be determined by measuring actual samples, by using known values, or by estimating values for the bodily fluid absorbed within the element.

The method 760 includes a sixth step 766 of determining a new swollen volume of the element. The new swollen volume of the element can be determined as a function of the total mass of the bodily fluid that has been absorbed by the absorbent material in the element, the porosity of the absorbent material in the element, and the amount of the absorbent material in the element. This relationship can be expressed as follows:

$$\Omega_{element\ next} = f(M_{fluid\ abs\ curr\ tot}, \epsilon_{abs}, M_{abs\ matl})$$

$M_{fluid\ abs\ curr\ tot}$ represents the total mass of the bodily fluid that has been absorbed by the absorbent material in the element, as of the current iteration. $M_{fluid\ abs\ curr\ tot}$ can be expressed as a value in grams, or another appropriate unit of mass. In an alternate embodiment, the amount of the bodily fluid absorbed in the element can be expressed in units of volume. Program instructions can execute to calculate $M_{fluid\ abs\ curr\ tot}$ by summing up the $M_{fluid\ abs\ curr}$ values for each of the iterations. $\epsilon_{abs}$ represents a porosity of the absorbent material, and can be determined as described in the second step 762. $M_{abs\ matl}$ represents the mass of the absorbent material. $M_{abs\ matl}$ can be expressed as a value in grams, or another appropriate unit of mass. In an alternate embodiment, the amount of the absorbent material in the element can be expressed in units of volume. $\Omega_{element\ next}$ represents the new swollen volume of the element, at the end of the sixth step. $\Omega_{element\ next}$ is expressed in cubic centimeters, or other appropriate units of volume. Program instructions can execute to calculate $\Omega_{element\ next}$ from the relationship shown above, as will be understood by one of skill in the art.

In the relationship shown above $\Omega_{element\ next}$ is a function of the variables $\Omega_{element\ curr}$, $M_{fluid\ abs\ curr}$, $\epsilon_{abs}$, and $M_{abs\ matl}$. This functional relationship can be determined based on empirical results for a particular absorbent material. In alternate embodiments, $\Omega_{element\ next}$ can be expressed as a function of less than all of the variables $M_{fluid\ abs\ curr}$, $\epsilon_{abs}$, and $M_{abs\ matl}$. As a first example, $\Omega_{element\ next}$ can be expressed as a function of $M_{fluid\ abs\ curr}$ and $M_{abs\ matl}$. As a second example, $\Omega_{element\ next}$ can be expressed as a function of $M_{fluid\ abs\ curr}$ and $\epsilon_{abs}$. In various embodiments, $\Omega_{element\ next}$ can also be expressed as a function of one or more other variables describing the physical characteristics of the absorbent material, the bodily fluid, and/or the element, as will be understood by one of skill in the art.

As an example of the functional relationship described above, the new swollen volume of the element can be determined based on the total mass of the bodily fluid that has been absorbed by the absorbent material in the element, the mass of the bodily fluid that has been absorbed per unit of mass of the absorbent material in the element, the density of the absorbent material in the element, and the volume fraction of absorbent material in the element. This relationship can be expressed as follows:

$$\Omega_{elementnext} = \frac{M_{fluidabscurrtot}}{(xload)(\rho_{abs})(f_{abscurr})}$$

$M_{fluid\ abs\ curr\ tot}$ represents the total mass of the bodily fluid that has been absorbed by the absorbent material in the element, as of the current iteration, as described above.

xload represents the mass of the bodily fluid that has been absorbed per unit of mass of the absorbent material in the element, as of the current iteration. xload is a unitless value. xload can be determined by measuring actual samples, by using known values, or by estimating values for the bodily fluid absorbed within the absorbent material in the element. xload can also be determined as a function of the current contact time, based on empirical results for a particular absorbent material.

$\rho_{abs}$ represents the density of the absorbent material and is expressed in grams/cubic centimeter, or other appropriate units of density. $\rho_{abs}$ can be determined by measuring actual samples, by using known values, or by estimating values for the density of the bodily fluid. In the embodiment of FIG. 7, $\rho_{abs}$ is a constant value.

$f_{abscurr}$ represents the volume fraction of absorbent material in the element, as of the current iteration. $f_{abscurr}$ is a unitless value. $f_{abscurr}$ can be determined by measuring actual samples, by using known values, or by estimating values for the volume of the absorbent material within the element. $f_{abscurr}$ can also be determined as a function of the porosity of the absorbent material in the element, based on empirical results for a particular absorbent material.

By repeating steps 761-766 in iterative fashion, the swelling of an element of absorbent material can be determined. By applying this method to the elements of the absorbent material, the overall swelling of the absorbent material can be determined and can be applied to a computer based model of the absorbent article, as illustrated in the embodiment of FIGS. 8A-8B.

Figure 8A:
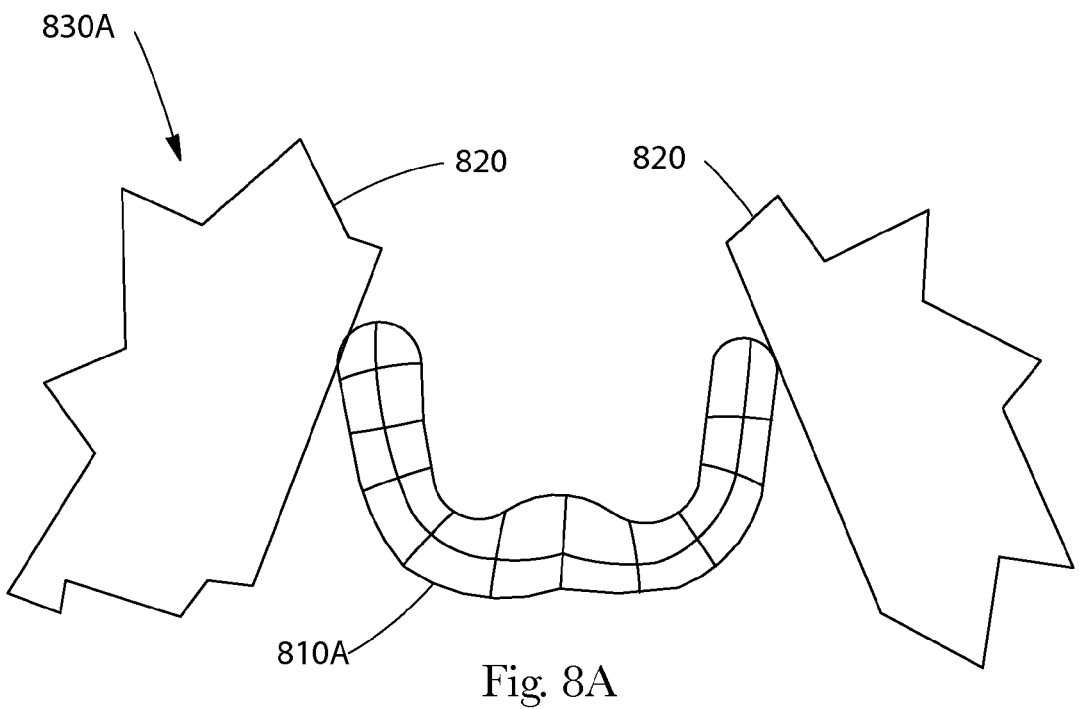
FIG. 8A is a cross-sectional side view illustrating a computer based model of an absorbent article fitted to a portion of a human body, wherein the article is in an unswollen state.

FIG. 8A is a cross-sectional side view illustrating a computer based model 830A of an absorbent article 810A fitted to a portion of a human body 820, wherein the article 810A is in an unswollen state, as in the third step 130 of the method 100 of the embodiment of FIG. 1.

Figure 8B:
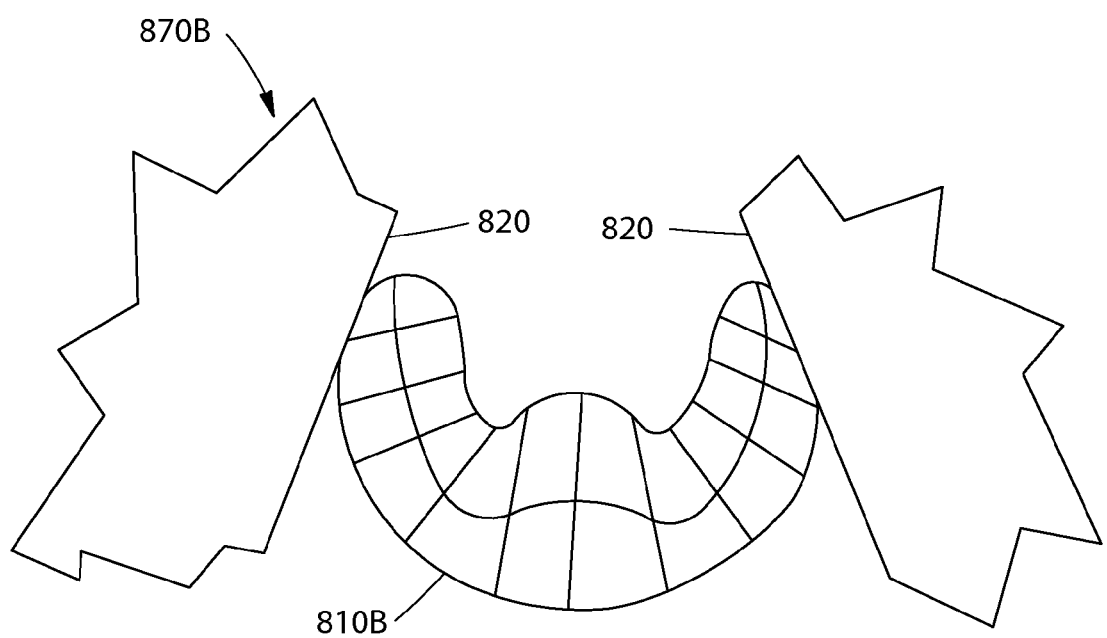
FIG. 8B is a view of FIG. 8A, wherein the article is in a swollen state.

FIG. 8B is a cross-sectional side view illustrating a computer based model 870B of the absorbent article 810B fitted to the portion of the human body 820, wherein the article 810B is in a swollen state, as in the seventh step 170 of the method 100 of the embodiment of FIG. 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of simulation, comprising:
representing at least a portion of an absorbent article with a computer based model of the absorbent article, wherein the absorbent article includes an absorbent material, and wherein the absorbent material is represented by a plurality of elements with each of the elements including an amount of the absorbent material;
representing a distribution of a bodily fluid in the article with a computer based model of the bodily fluid;
for each of the elements, determining a calculated swelling, based, at least in part, on an amount of the bodily fluid absorbed by the absorbent material in the element; and
transforming the model of the absorbent article by simulating a swelling of the absorbent article;
wherein, for each of the elements, the determining of the calculated swelling is based, at least in part, on a porosity of the absorbent material in the element.

2. The method of claim 1, wherein, for each of the elements, the determining of the calculated swelling is based, at least in part, on the amount of absorbent material in the element.

3. The method of claim 1, wherein the transforming the model of the absorbent article by simulating a swelling of the absorbent article uses finite element analysis and is based, at least in part, on the calculated swelling for each of the elements, to form a computer based model that represents the portion of the absorbent article in a swollen state.

4. The method of claim 1, including, for each of the elements, determining the amount of the bodily fluid absorbed by the amount of the absorbent material in the element, based, at least in part, on an amount of free bodily fluid in the element.

5. The method of claim 1, including, for each of the elements, determining the amount of the bodily fluid absorbed by the amount of the absorbent material in the element, based, at least in part, on a time step of the method.

6. The method of claim 1, including, for each of the elements, determining the amount of the bodily fluid absorbed by the absorbent material in the element, based, at least in part, on a rate of absorption of the bodily fluid by the absorbent material in the element.

7. The method of claim 6, including, for each of the elements, determining the rate of absorption, based, at least in part, on a contact time between the absorbent material in the element and the free bodily fluid in the element.

8. The method of claim 7, including, for each of the elements, determining the contact time, based, at least in part, on a physical characteristic of the absorbent material.

9. The method of claim 7, including, for each of the elements, determining the contact time, based, at least in part, on a size of the element.

10. The method of claim 7, including, for each of the elements, determining the contact time, based, at least in part, on a saturation level of the element.

11. The method of claim 10, including, for each of the elements, determining the saturation level based, at least in part, on a size of the element.

12. The method of claim 10, including, for each of the elements, determining the saturation level based, at least in part, on a porosity of the absorbent material in the element.

13. The method of claim 10, including, for each of the elements, determining the saturation level based, at least in part, on an amount of the free bodily fluid in the element.

14. The method of claim 13, including, for each of the elements, determining the amount of the free bodily fluid in the element, based, at least in part, on an amount of the bodily fluid flowing into the element.

15. The method of claim 13, including, for each of the elements, determining the amount of the free bodily fluid in the element, based, at least in part, on an amount of the bodily fluid flowing out of the element.

16. The method of claim 13, including, for each of the elements, determining the amount of the free bodily fluid in the element, based, at least in part, on an amount of the free bodily fluid in the element absorbed by the absorbent material in the element at a prior time.

17. The method of claim 1, wherein the representing of at least a portion of the absorbent article includes representing at least a portion of the absorbent article, using finite elements.

18. The method of claim 1, wherein the representing of at least a portion of the absorbent article includes representing at least a portion of the absorbent article as fitted onto a human body.

19. The method of claim 1, including simulating a flow of the bodily fluid on a surface of the absorbent article, using computational fluid dynamics, to form the computer based model of the bodily fluid.

20. The method of claim 1, wherein the amount of the absorbent material within at least some of the plurality of elements is zero.

21. A method of simulation, comprising:
representing at least a portion of an absorbent article with a computer based model of the absorbent article, wherein the absorbent article includes an absorbent material, wherein the absorbent material is represented by a plurality of elements with each of the elements including an amount of the absorbent material, and wherein the amount of the absorbent material within at least some of the plurality of elements is zero;
representing a distribution of a bodily fluid in the article with a computer based model of the bodily fluid;
for each of the elements, determining a calculated swelling, based, at least in part, on an amount of the bodily fluid absorbed by the absorbent material in the element; and
transforming the model of the absorbent article by simulating a swelling of the absorbent article;
wherein, for each of the elements, the determining of the calculated swelling is based, at least in part, on a porosity of the absorbent material in the element.

22. A non-transitory computer readable medium having instructions for causing a device to perform a method, the method comprising:
representing at least a portion of an absorbent article with a computer based model of the absorbent article, wherein the absorbent article includes an absorbent material, and wherein the absorbent material is represented by a plurality of elements with each of the elements including an amount of the absorbent material;
representing a distribution of a bodily fluid in the article with a computer based model of the bodily fluid;
for each of the elements, determining a calculated swelling, based, at least in part, on an amount of the bodily fluid absorbed by the absorbent material in the element; and
transforming the model of the absorbent article by simulating a swelling of the absorbent article;
wherein, for each of the elements, the determining of the calculated swelling is based, at least in part, on a porosity of the absorbent material in the element.

23. The method of claim 22, wherein the amount of the absorbent material within at least some of the plurality of elements is zero.

* * * * *